United States Patent
Tsunoda et al.

[11] 3,909,102
[45] Sept. 30, 1975

[54] COLOR HOLOGRAPHY

[75] Inventors: Yoshito Tsunoda; Fumio Imagawa, both of Hachioji, Japan

[73] Assignee: Hitachi, Ltd., Japan

[22] Filed: Jan. 10, 1974

[21] Appl. No.: 432,178

[30] Foreign Application Priority Data
   Jan. 10, 1973   Japan.................................. 48-5223

[52] U.S. Cl.................................. 350/3.5; 350/3.5
[51] Int. Cl.²...................... G03H 1/30; G03H 1/16
[58] Field of Search........................... 350/3.5; 358/2

[56] References Cited
UNITED STATES PATENTS
3,744,871  7/1973  Takeda et al. ........................ 350/3.5
3,746,783  7/1973  Gerritsen et al. ..................... 350/3.5

*Primary Examiner*—Ronald J. Stern
*Attorney, Agent, or Firm*—Craig & Antonelli

[57] ABSTRACT

A hologram composing apparatus comprises a light source which generates an information light beam and a reference light beam coherent therewith and a predetermined recording medium on which there are recorded a plurality of holograms composed to divide incident light into a plurality of small beams and to impart irregular phase shifts to the respective small beams. A first lens arrangement causes the information light beam to impinge on the holograms and a second lens collimates the light diffracted from the holograms and introduces it into an information constructing component. A third lens converges the light emerging from the information constructing component at different positions on a hologram recording medium, and an optical element is provided to direct the reference light beam to the respective convergence points.

4 Claims, 5 Drawing Figures

□ = $\theta_0$
▨ = $\theta_0 + \pi$

COLOR HOLOGRAPHY

BACKGROUND OF THE INVENTION

1. Field of the Invention

The present invention relates to a hologram composing apparatus and, more particularly, to a hologram composing apparatus which is suitable for high density storage of color information for use in a multi-color video package system, a multi-color image information retrieval system, etc.

2. Description of the Prior Art

Storing predetermined information on a photographic material by holography techniques, has the following advantages:

1. High density information can be stored without employing any optical system of high resolution;
2. The mechanism of storing information has redundancy, and hence information is hardly influenced by flaws;
3. Read-out is simple, and high speed read-out is possible;
4. Multiple storage is possible; and
5. Both digital and analog information can be processed.

Due to such advantageous features, holography techniques have been noted as a very useful means for providing an optical memory.

However, where a plurality of information data exist as in color information, holography techniques involve several serious problems when composing the holograms, and attempts have been devised to solve these problems. The following are examples of such problems:

1. A ghost image is generated during reconstruction;
2. Speckle noises appear in the reconstructed image;
3. The storage density is low; and
4. The diffraction efficiency is low.

More specifically, the phenomenon (1) means that since a hologram is constructed in such a manner that interference fringes obtained by light sources of a plurality of colors are superimposed at the same position on a photographic medium, the reconstructed images from the interference fringes of blue and green by a reconstructing light beam of, the color red for example, are superimposed on an intended reconstructed image of the color red and thus degrade the intended image during reconstruction of the hologram.

The appearance of speckle noises (2) means that in reconstructing a picture after transforming information into a hologram for storage, defects in the information occur in the reconstructed picture because the size of the hologram is definite. In an attempt to solve these problems, the following solutions have been proposed.

Regarding the problem (1) of the ghost image, as reported in "Applied Optics," Vol. 6, page 1091, Collier et al, have devised a method of encoding reference waves of the respective colors or making interference fringes of the respective colors at different positions. With such a method of making interference fringes of the respective colors at different positions, the images of the respective colors are, in principle, recorded independently. The method, is therefore, advantageous in not creating a ghost image, and has been thought to be preferable in comparison with other methods. Since, however, this system creates the interference fringes at individual positions, the hologram area becomes several times as large as those of the other systems. It is, accordingly, necessary to diminish the hologram area for a single color. With the diminution, information defects occur and speckle noise appears, so that a hologram of good quality is not obtainable.

In order to eliminate these drawbacks, the following technique has been suggested.

Referring to FIG. 1 of the accompanying drawings, laser beams of a plurality of wavelengths, emerging from laser light sources 1 and 2 are combined and then divided into an information light beam 4 and a reference light beam 5 by means of a beam splitter 3.

The information light beam 4 passes through a writing lens 6, a random phase shifting plate 7, a sampling mesh or grating 8 and a color information constructing component 9, and, thereafter, converges onto a photographic material 10. With this arrangement, the convergence points on the photographic material for the light beams of the respective wavelengths are different due to the movement of the writing lens 6 or by the provision of a prism 16. On the other hand, the reference light beams 15 are also directed to points different for the light beams of the respective wavelengths by the action of mirror deflector 14.

Accordingly, holograms by the light beams of the respective wavelengths are ultimately composed separately at the different points 11, 12 and 13 on the photographic material. When the random phase shifting plate and the sampling mesh are employed for composing a hologram with a light beam of a single wavelength, a hologram of good quality free from speckle noise can be obtained at a high density up to the diffraction limit by the function thereof. The effect of the random phase shifting plate and the sampling mesh is described in U.S. Pat. Application Ser. No. 340,883, filed Mar. 13, 1973, and assigned to the assignee of the present application. For purposes of brevity, however, the description therein will be omitted here.

As previously explained, this method is excellent with respect to the prior art for composing a high density color hologram. As is apparent from FIG. 1, however, the construction of the hologram composing apparatus is complicated, and its operation is troublesome. A writing lens-moving device, the mirror deflector etc. must have a high degree of precision, which results in the complexity of the mechanism. Even where the system for changing the travelling path of light beam, using a prism is adopted, a considerably large prism is required in order to establish a satisfactory separation of light beams on the hologram plane. Although the color hologram finally composed has very good quality, such complexity of the apparatus is disadvantageous.

SUMMARY OF THE INVENTION

An object of the present invention is to provide an apparatus for composing a hologram of high density and high quality.

Another object of the present invention is to provide a hologram composing apparatus which has a reduced number of mechanical moving parts.

The hologram composing apparatus of the present invention for accomplishing such objects is characterized in that illumination holograms composed at two or more different positions of a predetermined medium are used, to thereby make the movement of a prism, a mirror deflector or a lens unnecessary.

DESCRIPTION OF THE PREFERRED EMBODIMENTS

Figure 1:
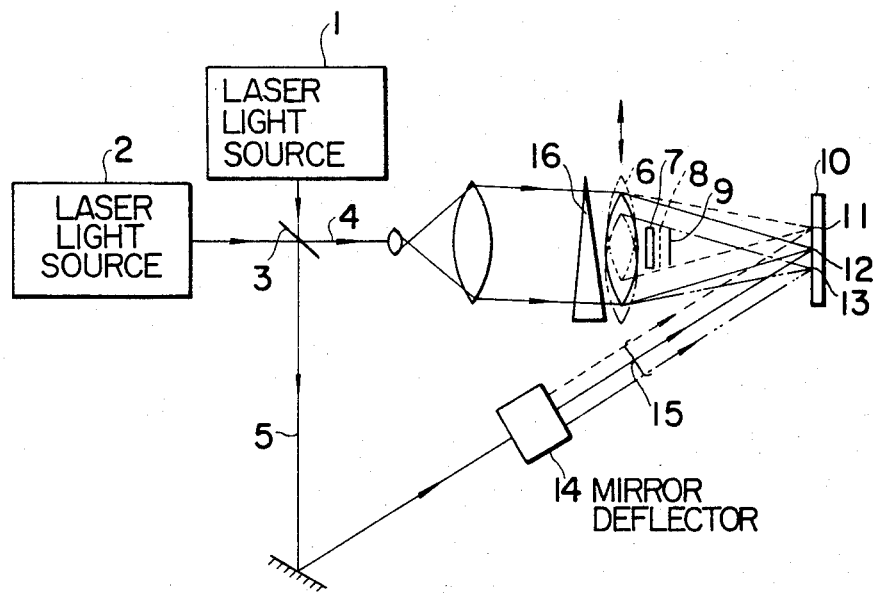
FIG. 1 is a diagram showing an example of a prior art system for composing a high density color hologram.
Figure 2:
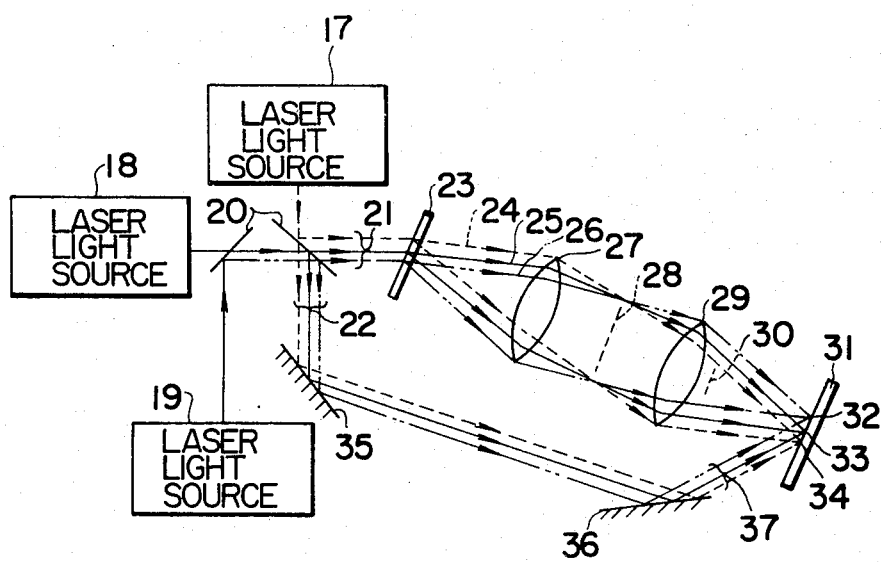
FIG. 2 is a diagram showing hologram composing apparatus according to an embodiment of the present invention.

FIG. 2 shows a color hologram composing apparatus embodying the present invention. Referring to the Figure, light beams of a plurality of wavelengths from laser light sources 17, 18 and 19 are divided into information or object beams 21 and reference beams 22 by means of beam splitters 20. The information beams 21 are directed to impinge on a color illumination hologram 23 as separate non-overlapping beams, each separate beam being of only one wavelength.

In the hologram 23, holograms equal in number to the beams of the plurality of wavelengths are arranged independently. The respective holograms are composed beforehand by light beams of wavelengths equal to those of the incident light beams. When the information beams 21 impinge on the color illumination hologram 23, expanded beams for illumination 24, 25 and 26 are generated as diffracted light beams from the respective holograms. The diffracted light beams 24, 25 and 26 respectively differ in wavelength, and become collimated beams after passing through a collimator lens 27. After passing through an information constructing component or storage element positioned at 28 or 30 and writing lens 29, they converge to different points 32, 33 and 34 on a photographic material 31. These points correspond to the expanded illumination beams 26, 25 and 24, respectively. Employed as the information constructing component is, for example, a color film. The position of installation of the component is, for example, the part 28 or 30, and may be any part at which the beams of a plurality of wavelengths are superimposed. When previously composing the color illumination hologram, the illuminating light beams become a plurality of small beams having random phase shifts only on the information constructing component.

On the other hand, the reference beams 22 have their travelling paths changed by mirrors 35 and 36, and interfere with the information beams on the photographic material. Holograms 32, 33 and 34 are, consequently, produced by the beams of the respective wavelengths. The characteristics of the color hologram thus composed will now be explained.

Consider the case of composing a single hologram. It is well known that when a laser light beam converges onto a photographic material after passing through only a writing lens and an information constructing component, the information light beam is locally concentrated on the photographic material. This is attributed to the fact that the general picture information data etc. have large quantities of low frequency components. In this respect, the present invention provides an improvement by, as explained above, forming the color illumination hologram, so that the diffracted light beams from the hologram may become a plurality of small beams having random phase shifts.

When the information constructing component is illuminated by such diffracted light beams, the information is divided and sampled by the small beams, and only the necessary parts are taken out. In effect, this makes the spacial frequency components of the information uniform; however, the concentration of light is still effected on the hologram plane by auto-correlation among the small beams. As a matter of fact, the respective small beams have random phase shifts as previously discussed. Thus, the auto-correlation effect is eliminated, and a hologram having a uniform light intensity distribution is obtainable. Moreover, the size of the hologram can be reduced to the diffraction limit, which is determined by the diameter of the small beam. Further, since essentially all the information is contained in the small hologram, speckle noise due to the defects of information does not occur.

A reconstructed color image of high quality is accordingly obtained by incoherently superimposing reconstructed images from the high quality holograms which have been obtained for the beams of the respective wavelengths. In addition, each hologram is at the high density of the diffraction limit, so that the hologram area is very small even for a plurality of such holograms. As a result, a high quality and high density color hologram which not heretofore produced can be composed.

Once the color illumination hologram has been composed, a color hologram can be composed by the use of the apparatus which is much simpler than the prior art systems. In the prior art, problems have occurred in that, since the random phase shifting plate is effective only for a single wavelength, it must be replaced for every change of the wavelength of the light source. In the present invention, after the procedure is once made at the composition of the color illumination hologram, it is not necessary. The hologram composition is therefore simplified.

Figure 3:
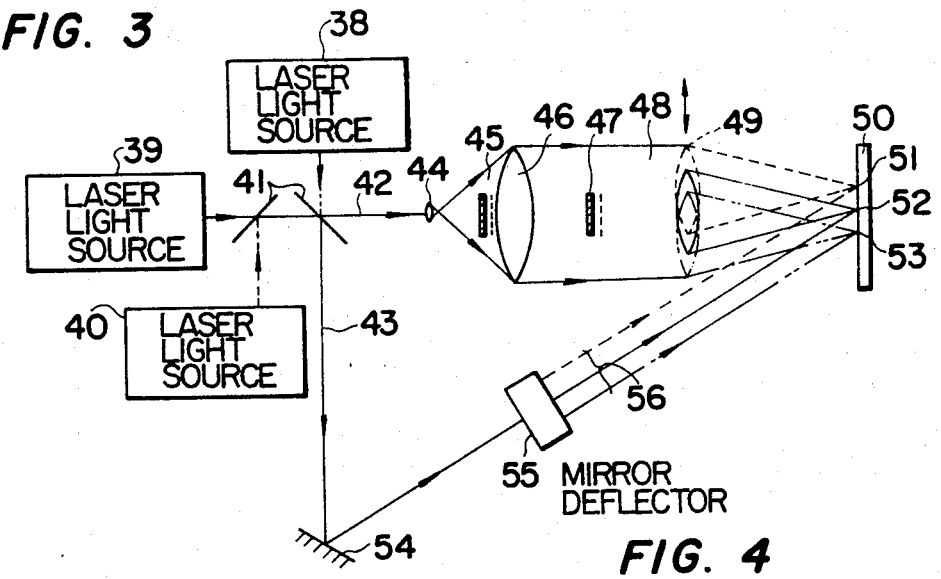
FIG. 3 is a diagram showing an apparatus for composing a color illumination hologram which is used in the embodiment of the invention.

An apparatus for composing the color illumination hologram in the present invention is shown in FIG. 3.

Beams of a plurality of wavelengths from laser light sources 38, 39 and 40, which are operated sequentially, are divided into information or object beams 42 and reference beams 43 by beam splitters 41. The information beams pass through a beam expanding lens 44, and are thereafter converted into expanded and collimated beams 48 by a collimator lens 46. In the expanded beams, the combination of a random phase shifting plate and a sampling mesh or grating is placed at position 45 or at position 47. After passing therethrough, the expanded and collimated beams 48 converge onto a photographic material 50 through writing lens 49. At this time, light beams are sequentially caused to impinge from the laser light sources. They are made incident in the order of, for example, red, green and blue.

The position of the writing lens 49 is displaced to different respective positions for each exposure for the beams of the respective wavelengths. By way of example, the position of the dotted lines in FIG. 3 corresponds to red, the position of the solid lines corresponds to green, and the position of the chain lines corresponds to blue.

Consequently, the convergence positions on the photographic material for the beams of the respective wavelengths differ as shown at 51, 52 and 53.

On the other hand, the reference beams 43 have their travelling paths changed by a mirror 54, and are thereafter converted into reference beams 56, separated in correspondence with the wavelengths, by means of a mirror deflector 55. They are caused to interfere with the information light beams, to compose holograms 51, 52 and 53 constituting the color illumination hologram.

Although the combination of the random phase shifting plate and the sampling mesh may be placed at either the position 45 or the position 47 shown in FIG. 3, it may be put at any position within the expanded beams. The composed color illumination hologram reconstructs the images of the random phase shifting plate and the sampling mesh at the above-mentioned position when used in the apparatus in FIG. 2, and hence, the color information constructing component may be placed only at that position.

Figure 4:
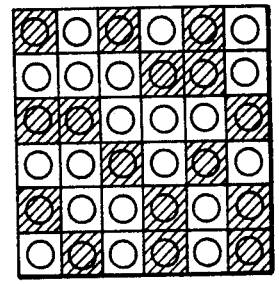
FIG. 4 is a diagram showing the state of superposition between a random phase shifting plate and a sampling mesh which are employed in the composition of the color illumination hologram.

FIG. 4 illustrates the superposition of the sampling mesh on the random phase shifting plate. The random phase shifting plate in the figure can impart a phase shift of 0 or $\pi$ radians to the incident light (each part of oblique lines in the figure imparts a phase shift of $\pi$ radians), but this form is not restrictive. In some cases, the sampling mesh is not employed, and its role is also effected by the random phase shifting plate.

Figure 5:
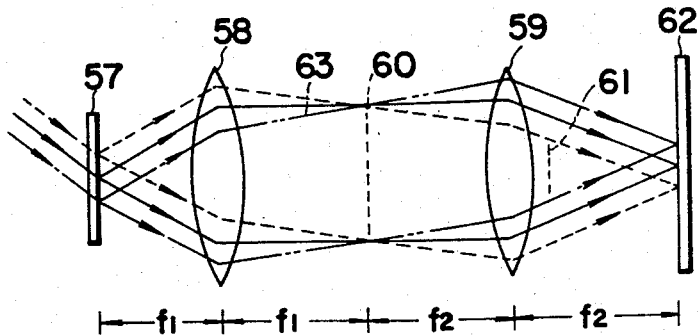
FIG. 5 is a diagram for explaining the function of the color illumination hologram.

The function of the color illumination hologram thus composed will now be again considered. The color illumination hologram is constituted of a plurality of holograms which are constructed at respectively independent positions for the beams of a plurality of wavelengths. When reconstructing light beams are brought into incidence on the holograms, beams reconstructed from the respective holograms assume the optical paths shown in FIG. 5. Diffracted light beams of the different wavelengths emergent from the different holograms on the color illumination hologram 57 pass through a lens 58, and thereafter become collimated beams 63 and advance towards the focal plane of the lens 58. When the focal plane of the lens 58 and that of a lens 59 are common, the collimated beams 63 further pass through the lens 59 and thereafter converge at different points on a photographic material 62.

The color information constructing component is placed at, for example, a position 60 or a position 61. This position may correspond to the position at which the random phase shifting plate and the sampling mesh are placed at the composition of the color illumination hologram.

According to the hologram composing apparatus of the present invention described above, a number of advantageous effects as follows are achieved:

1. Ghost images in a color hologram can be eliminated;
2. Speckle noise in a color hologram can be eliminated;
3. the composition of a high density color hologram can be realized; and
4. The color hologram composing apparatus can be simplified.

Among other effects, the simplification of the hologram composing apparatus is so remarkable that no prior art apparatus can compare therewith, and the simplified apparatus is especially practical.

The application of the present invention is not restricted to a color hologram composing apparatus in which light source means employed are of a plurality of colors. If the invention is employed for composing different holograms at a plurality of positions by the use of hologram composing apparatus having light source means of a single color, the holograms can be simply composed without using any complicated device for the movement of a writing lens etc. This is effective where a plurality of holograms are composed, so that reconstructed images from the holograms on a dry plate may be formed at the same place.

While we have shown and described several embodiments in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

What we claim:

1. A color hologram comprising apparatus comprising:
   first means for generating an information coherent light beam and a reference coherent light beam each of said information and reference light beams being made up of respective red, green and blue light wavelength components;
   second means for directing said information light beam onto an illumination hologram medium composed of a plurality of illumination holograms disposed at a plurality of different positions thereon, said respective illumination holograms being holograms produced by red, green, and blue light wavelengths at said different positions on said illumination hologram medium corresponding to said red, green and blue light wavelengths and each of said illumination holograms respectively having the property of simultaneously dividing said light beam incident thereon into a plurality of discrete smaller diffracted rays, the phase shifts of which are irregularly distributed relative to one another;
   a recording medium disposed in the path of said information light beam;
   third means for directing the red, green and blue light rays diffracted by said illumination hologram onto an information storage element and for causing the red, green and blue light rays emanating therefrom to converge at respectively different positions on said recording medium; and
   fourth means for directing said reference light beam onto said respectively different positions on said recording medium.

2. A hologram composing apparatus according to claim 1, wherein said third means comprises a collimating lens and a converging lens disposed optically in series between said illumination hologram medium and said recording medium.

3. A hologram composing apparatus according to claim 2, wherein said information storage element is disposed between said collimating lens and said converging lens.

4. A hologram composing apparatus according to claim 2, wherein said information storage element is disposed between said converging lens and said recording medium.

* * * * *